Feb. 28, 1961 K. G. DUMBRELL 2,972,828
CONSTRUCTION OF EAR TAG FOR USE IN THE MARKING
OF SHEEP, CATTLE, AND OTHER ANIMALS
Filed Oct. 30, 1957

INVENTOR
KENNETH GEORGE DUMBRELL
BY Oberlin & Limbach
ATTORNEYS.

United States Patent Office 2,972,828
Patented Feb. 28, 1961

2,972,828
CONSTRUCTION OF EAR TAG FOR USE IN THE MARKING OF SHEEP, CATTLE, AND OTHER ANIMALS
Kenneth George Dumbrell, 33A Harcourt St., Auburn, near Melbourne, Victoria, Australia
Filed Oct. 30, 1957, Ser. No. 693,281
Claims priority, application Australia Nov. 1, 1956
5 Claims. (Cl. 40—302)

This invention relates to an improved construction of ear tag for use in the marking of sheep, cattle, and other animals, and it refers particularly to ear tags of that general construction or type illustrated in the U.S. Design Patent No. 170,913.

It is known to provide ear tags, of the type illustrated in the U.S. Design Patent No. 170,913, for marking sheep, cattle and other animals so that they may be readily identified. These tags are made in a range of colours to provide for a ready identification of the age of the animals—as sheep—to which they are attached. Thus a different colour may be used each year in the production of the tags, and a different colour used each year by the sheep owners, so that if red, for example, were the colour of all tags used in the year 1955 then in 1957 a sheep marked with a red tag would be known to be two years old as sheep are tagged at a definite time each year. Further, it is customary to mark each tag with the name of the farm or ranch to which the animals belong—as by printing or impressing the name on the outer surface of one arm of the tag. But it is not easy to determine the ownership of the sheep as it is necessary to inspect each tag closely to read the name of the farm or ranch.

This invention has been devised principally with the object of providing ear tags of the general type mentioned and so constructed that they may have incorporated therewith identification means such that the ownership of an animal, to which such an ear tag is attached, may be determined at a glance, even from a distance.

In dealing with sheep, cattle and other animals the ownership of such animals is often changed and it is desirable that there be provided some convenient manner of indicating the changes which do occur in ownership of the animals from time to time. Obviously, it is not practicable to remove the ear tags marked with the name of one farm or ranch and to apply a fresh tag to the ear of the animal, and neither is it practicable to impress the name of the new owner on the ear tag, as has been proposed.

A further object of the invention, therefore, is to provide an ear tag which may be altered, or added to, so as to indicate change of ownership when an animal bearing the ear tag has been sold.

According to this invention there is provided an ear tag of the general type illustrated in the U.S. Design Patent No. 170,913, that is to say, an ear tag having a back portion and two arms extending forwardly therefrom, at least one of the arms having its front or outer end curved towards the other arm so that said arms are closed or nearly closed at their outer ends, wherein at least one of the arms is so constructed that there may be fitted to it one or more identification members. Such identification members may be made in a wide range of colours and the colours used are such as to contrast with the basic colour of the ear tag so as to provide ready identification. It is preferred that the identification members be made so that they may be readily attached to the tag but, when once fitted in position, cannot be readily detached.

In another aspect of the invention the ear tag comprises a back portion, two arms extending forwardly therefrom, and attached to one at least of said arms at least one non-integral identification member of a colour contrasting with that of the major part of the ear tag.

In order that the invention may be readily understood and conveniently put into practical form, I shall now describe, with reference to the accompanying illustrative drawings, several different forms of ear tag made according to the invention. In these drawings.

Figure 1:
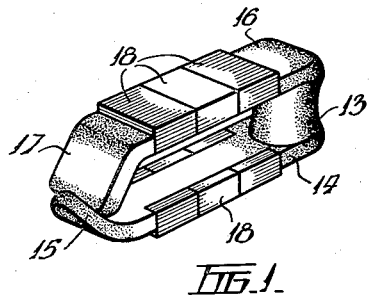
Fig. 1 is a perspective view of one form of ear tag showing identification members attached to both arms of the tag.
Figure 2:
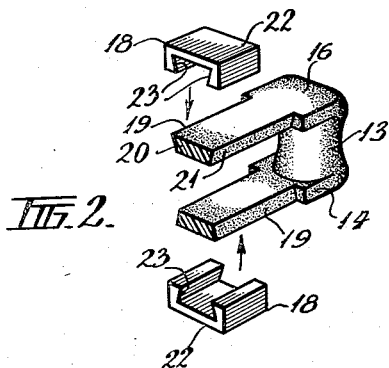
Fig. 2 is a fragmentary view showing the rear portion of the tag and, in detached relationship, identification members of the two arms.

Referring initially to the construction illustrated in Fig. 1, the ear tag has a back portion 13 of substantially circular shape in cross-section, an arm 14 which extends forwardly from the lower end of the back portion 13 and having at its front end an upturned lip 15, an arm 16 extending forwardly from the upper end of the back portion 13 and having at its front end a downturned lip 17, the major part of the arm 17 being substantially parallel to the major portion of the arm 14 and the outer end of the lip 17 fitting within the lip 15, and a number of identification members 18 fitted to the arms 14 and 16.

Each of the arms 14 and 16 is recessed at 19 on its opposite sides so that the part of each arm between the opposite end portions of the arm—denoted by the reference 20—is of smaller width than the end portions immediately adjacent the recesses 19. The cross-section of the part 20 is substantially uniform for the length of that part and is of trapezoidal shape, with the opposite sides 21 inclined or chamfered or tapered inwardly from the outer side of the arm.

Each of the identification members 18 has a substantially flat outer side 22 and two inclined sides 23 being of the same tapered or inclined shape as the sides 21 so as to be adapted to fit tightly about the opposite, tapered sides 21 of the parts 20 of the arms 14 and 16. The identification members 18 are of such length in relation to the lengths of the parts 20 of the arms 14 and 16 that three of the members may be fitted on to each of the arms 14, 16.

The members 18 are made of a somewhat resilient material so that they may be fitted to the arms 14, 16 by snapping them in position. When they have been so fitted they will be rather hard to detach due to the grip of the tapered or inclined sides 23 of the members 18 on the tapered or inclined sides 21 of the arms 14, 16.

It is apparent that if the body portions of the ear tags—that is to say, the back portions 13 and the integral arms 14 and 16—be made in a range of twelve different colours and if the identification members be made in the same range of colours then there will be obtained a very large range of ear tags having different colour combinations in the identification members 18. Thus, for one sheep owner there will be one particular colour combination in the identification members 18 for the purpose of identifying sheep owned by him. That colour combination may be used on one arm only of the ear tag and the other arm may be used for retaining identification members of the colour combination of a purchaser in the event of the first owner of the sheep selling them to some other person. Thus, if the original owner of a mob of sheep sells the mob to another person the tag fitted to the ear of each sheep will bear on one arm identification members of the particular colour combination of the first owner and on the other arm it will bear identification members of the colour combination of the second owner.

Figure 3:
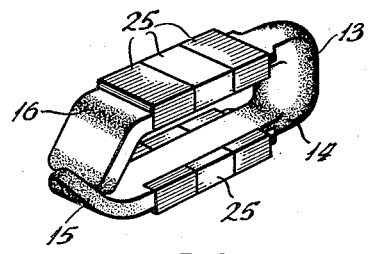
Fig. 3 shows a perspective view of a modified construction.
Figure 4:
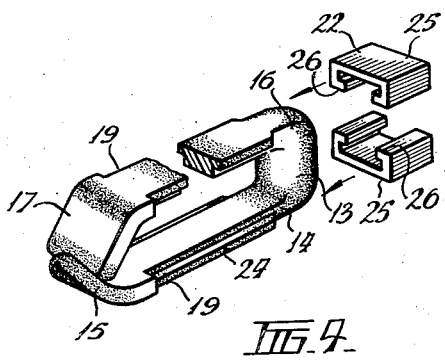
Fig. 4 is an exploded, fragmentary view detailing the construction of that tag and the identification members.

Referring now to the construction illustrated in Figs. 3 and 4 it will be noted that each of the arms 14, 16, in this construction is recessed at 19 on its opposite sides, and each side of each arm has a longitudinal flange 24. The rear portion of each arm is smaller in width than the recessed portion 20 so that identification members 25 may be slid on to said arms 14, 16 from the rear end thereof, and said identification members have substantially flat outer sides 22 and inturned lips 26 adapted to engage inwardly of the flanges 24 so as to hold the identification members in position. The members 25 are made so that they are a tight sliding fit on the parts 20 of the arms 14, 16 but in order to ensure that they are secured in position it is preferred that an adhesive be used so that when the identification members have been fitted to an ear tag they will be inseparable therefrom.

The lengths of each member 25, in relation to the recessed portions 20 of the tag arms, is such that a desired number of members 25 may be readily fitted to each arm. Thus, there may be made provision for fitting two, three, four or more identification members to each arm of the ear tag.

Figure 5:
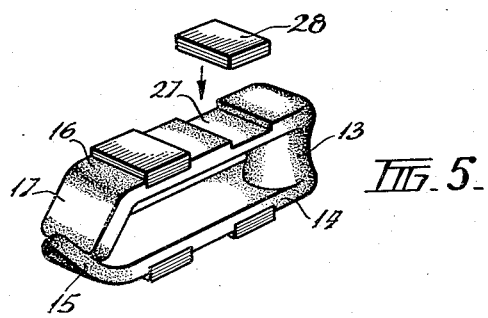
Fig. 5 illustrates a further modification.

Fig. 5 illustrates a further modification in which each arm of the tag is provided with two transverse recesses 27 in its outer surface and each identification member 28 is made to fit neatly in said recesses 27. The members 28 may be fastened in position by a suitable adhesive.

The ear tags may be used for the purpose of identification in manner other than that described above. For example, each sheep-producing State may be identified by the basic colour of the tag and the identification members used to indicate a particular owner in each State so that the same combination of colours of identification members may be used for a number of different owners in different States, the animals of those different owners being identified by the different basic colours of the ear tag. Or, in another mode of use, the basic colour of the tag may be used to indicate the age of the animal to which the tag is attached, the middle identification member, for example, may be used to indicate the State and the other identification members may be used to indicate the particular owner in each State.

The ear tags and the identification members therefor may be conveniently made in a suitable organic synthetic resin or plastic material such as polystyrene, or an acetate plastic. The principal requirement for the basic part of the tag is that it be somewhat resilient—to allow the arms 14, 16 to be sprung apart so as to enable it to be fitted in position with the rear portion 13 located in a hole punched in the ear of a sheep or a cow or steer and the arms 14, 16 located on opposite sides of the ear. A subordinate requirement, common to both the basic portion of the tag and to the identification members, is that the material be substantially colour-fast so that the colours of the parts will not fade unduly in use. And a third requirement is that the material be such that the identification members may be secured adhesively in position.

When the ear tags are to be used on sheep it is also a requirement that the back portion 13 of the tag be of such width that it will not catch in the comb of shearing clippers, that the arms 14 and 16 be of a width greater than that of the back portion 13 so that when once fitted in position—with the back portion 13 fitting neatly in a hole punched in the ear of a sheep—the tag will not tend to slip out of engagement with the ear, and that the outer or front ends of the arms 14, 16 be made so that they can readily spring apart to allow the comb of shearing clippers to slide out of the tag if it should catch between an arm of the tag and the ear to which it is fitted. The ear tag illustrated has been designed principally for use with cattle, the overlapping ends 15, 17 being desirable in ear tags for cattle but not in ear tags for sheep.

What I claim is:

1. A tag adapted for permanent attachment to an ear of an animal comprising a generally U-shaped body of synthetic plastic including a back portion for engagement in a punched hole in such ear, said back portion being substantially of circular shape in cross-section throughout its length but of varying diameter, the smallest diameter occurring intermediate the ends of said back portion, two arms extending from said ends of the back portion in substantially parallel relation and having a maximum width at the point of connection with said back portion which is at least equal to the diameter of said back portion ends, said arms serving to prevent said circular back portion from leaving such hole in an animal's ear and thereby locking the tag relatively to such ear, said arms being resiliently supported by said back portion to permit the arms to be appreciably sprung apart, said arms further terminating in lip portions, one lip fitting within the other lip to provide overlapping ends, at least one of said arms having a recessed portion along its length, and a plurality of U-shaped resiliently deformable identification members to provide cooperating indicia, each identification member having legs to embrace said recessed portion to permit ready attachment and subsequent removal of said member with respect to said one arm, the combined length of said members being substantially equal to the length of said recessed portion, said members being removable to accommodate desired changes of identification by such tag without requiring removal of the tag from such ear.

2. An ear tag as claimed in claim 1 wherein the side edges of the recessed portion of the arm are tapered so that the recessed portion of the arm is of substantially dove-tail shape in transverse cross-section, and the side portions of the identification members are tapered to conform to the taper of the said side edges.

3. An ear tag as defined in claim 1 wherein the identification members of said plurality are of contrasting colors.

4. A tag adapted for permanent attachment to an ear of an animal comprising a generally U-shaped body of synthetic plastic including a back portion for engagement in a punched hole in such ear, said back portion being substantially of circular shape in cross-section throughout its length but of varying diameter, the smallest diameter occurring intermediate the ends of said back portion, two arms extending from said ends of the back portion in substantially parallel relation and terminating in lip portions, one lip fitting within the other lip to provide overlapping ends, said arms being resiliently supported by said back portion to permit the arms to be appreciably sprung apart, each of said arms having a maximum width at the point of connection to an end of said back portion which is substantially equal to the diameter of such end, said arms serving to prevent said circular back portion from leaving such hole in an animal's ear and thereby locking the tag relatively to such ear, at least one of the arms being recessed transversely in its outer surface, and a separate identification member adapted to be removably engaged in such recessed portion of the arm, said identification member being removable to accommodate desired changes of identification by such tag without requiring removal of the tag from such ear.

5. An ear tag as defined in claim 4 wherein said arm and said identification member are of contrasting colors to aid in such identification.

References Cited in the file of this patent
UNITED STATES PATENTS

| | | |
|---|---|---|
| D. 170,913 | Dumbrell | Nov. 24, 1952 |
| 1,382,091 | Ketchum | June 21, 1921 |
| 1,447,982 | Hennefer | Mar. 13, 1923 |
| 1,840,567 | Chernow | Jan. 12, 1932 |
| 2,016,644 | Luball | Oct. 8, 1935 |
| 2,564,629 | Skrandel | Aug. 14, 1951 |
| 2,653,402 | Bonagura | Sept. 29, 1953 |